United States Patent
Yae

(10) Patent No.: US 10,572,272 B2
(45) Date of Patent: Feb. 25, 2020

(54) APPARATUS AND METHOD FOR PROVIDING ADAPTIVE CONNECTED SERVICE

(71) Applicant: Hyundai Motor Company, Seoul (KR)

(72) Inventor: Seong Soo Yae, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 393 days.

(21) Appl. No.: 15/371,696

(22) Filed: Dec. 7, 2016

(65) Prior Publication Data

US 2018/0060095 A1 Mar. 1, 2018

(30) Foreign Application Priority Data

Sep. 1, 2016 (KR) .................. 10-2016-0112618

(51) Int. Cl.
| | | |
|---|---|---|
| G06F 11/00 | (2006.01) | |
| G06F 9/445 | (2018.01) | |
| G06F 11/07 | (2006.01) | |
| G01C 21/26 | (2006.01) | |

(52) U.S. Cl.
CPC ...... *G06F 9/44505* (2013.01); *G06F 11/0721* (2013.01); *G01C 21/26* (2013.01); *G06F 11/079* (2013.01)

(58) Field of Classification Search
CPC .... G06F 9/4406; G06F 9/445; G06F 9/44505; G06F 9/44536
See application file for complete search history.

(56) References Cited

U.S. PATENT DOCUMENTS

| | | | | |
|---|---|---|---|---|
| 9,674,249 B1* | 6/2017 | Kekre | ............... | H04L 65/60 |
| 2002/0152021 A1* | 10/2002 | Ota | ............... | G01C 21/26 |
| | | | | 701/454 |
| 2002/0157018 A1* | 10/2002 | Syvanne | ............... | H04L 41/082 |
| | | | | 726/6 |
| 2004/0260750 A1* | 12/2004 | Ruutu | ............... | H04L 47/15 |
| | | | | 709/200 |
| 2015/0212825 A1* | 7/2015 | Kim | ............... | G06F 9/4406 |
| | | | | 713/2 |

(Continued)

FOREIGN PATENT DOCUMENTS

| | | |
|---|---|---|
| EP | 2 501 567 A1 | 9/2012 |
| JP | 2013-507294 A | 3/2013 |
| JP | 2014-159278 A | 9/2014 |

(Continued)

*Primary Examiner* — Katherine Lin
(74) *Attorney, Agent, or Firm* — Mintz Levin Cohn Ferris Glovsky and Popeo, P.C.; Peter F. Corless

(57) ABSTRACT

An audio-video-navigation (AVN) system for vehicles includes: a communication unit connected with a service or device; a memory storing at least one of first operation parameters or at least one of second operation parameters corresponding to a connected service or device; and a controller determining whether a normal operation is performed with the at least one loaded operation parameter and changing the at least one loaded parameter based on whether a normal operation is performed with the at least one loaded operation parameter. The controller performs a control operation to store at least one part of adaptively changeable predetermined parameters as the at least one of second operation parameters based on whether a normal operation is performed with the at least one loaded operation parameter.

14 Claims, 5 Drawing Sheets

(56) References Cited

U.S. PATENT DOCUMENTS

2015/0339391 A1\* 11/2015 Kang .................. G06F 16/9535
  707/722
2016/0381234 A1\* 12/2016 Sato .................. H04N 1/00029
  358/1.15

FOREIGN PATENT DOCUMENTS

| JP | 2015-228613 A | 12/2015 |
| JP | 2016-012918 A | 1/2016 |
| KR | 2011-0059418 A | 6/2011 |
| KR | 2011-0059420 A | 6/2011 |
| KR | 10-1047144 B1 | 7/2011 |
| KR | 10-2017-0048023 A | 5/2017 |
| KR | 10-2017-0105545 A | 9/2017 |
| WO | 2014-070076 A1 | 5/2014 |

\* cited by examiner

APPARATUS AND METHOD FOR PROVIDING ADAPTIVE CONNECTED SERVICE

CROSS-REFERENCE TO RELATED APPLICATION

This application claims the benefit of and priority to Korean Patent Application No. 10-2016-0112618, filed on Sep. 1, 2016, which is hereby incorporated by reference in its entirety as if fully set forth herein.

BACKGROUND OF THE DISCLOSURE

Technical Field

The present disclosure relates generally to an audio-video-navigation (AVN) system for vehicles and, more particularly, to an AVN system for vehicles which is capable of efficiently providing services according to connection with external devices and a method for controlling the same.

Discussion of the Related Art

"Connected services" rely on a connection among two or more peer devices and conceptually cover all services provided through a connection between devices or between a device and a server. Generally, connected services are implemented in a manner that communication and control are performed and a service is provided using a basic communication rule called a protocol defined between peer devices.

Connected services are widely employed for such services as connection between an audio-video-navigation (AVN) system (or head unit) of a vehicle and external terminals such as a smartphone or smart tablet. However, in actually providing such a service, compatibility of devices with a protocol defined between the devices (or server) can suffer. For example, compatibility can suffer when providing connected services such as "Car Play," "Android Auto," or a similar server-based voice recognition service.

More specifically, when providing the connected services, operational specifications of peer devices from different manufacturers differ from each other, and a corresponding service can become unavailable to customers because the service is unconditionally excluded. This causes customers to suspect problems with their own products and recognize that the products malfunction.

Such issue may be raised when i) a time delay occurs in transmitting a result of processing of a command/request, and the device determines the time delay as indicating an unsupportable function or an error, ii) an error occurs in the middle of communication between connected devices/services, and the error is determined as a result, regardless of the resulting operation, and iii) operational processing is not actually performed in the device for a command issued by a device/service.

Therefore, the service or function is not implemented, and customers repeatedly experience errors.

SUMMARY OF THE DISCLOSURE

Accordingly, the present disclosure is directed to an apparatus and method for providing an adaptive connected service that substantially obviate one or more problems due to limitations and disadvantages of the related art.

An object of the present disclosure is to provide an apparatus for more conveniently providing a connected service between a vehicle and an external device and a method for controlling the same. Another object of the present disclosure is to provide an apparatus for adaptively handling errors resulting from operational states according to various services or devices, and a method for controlling the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with embodiments of the disclosure, a method for controlling an audio-video-navigation (AVN) system for vehicles includes: loading at least one of first operation parameters or at least one of second operation parameters corresponding to a connected service or device; determining whether a normal operation is performed with the at least one loaded operation parameter; and changing the at least one loaded operation parameter based on whether a normal operation is performed with the at least one loaded operation parameter. The changing of the at least one loaded operation parameter comprises: storing at least one part of adaptively changeable predetermined parameters as the at least one of second operation parameters based on whether a normal operation is performed with the at least one loaded operation parameter.

Furthermore, in accordance with embodiments of the present disclosure, an audio-video-navigation (AVN) system for vehicles includes: a communication unit connected with a service or device; a memory storing at least one of first operation parameters or at least one of second operation parameters corresponding to a connected service or device; and a controller determining whether a normal operation is performed with the at least one loaded operation parameter and changing the at least one loaded parameter based on whether a normal operation is performed with the at least one loaded operation parameter. The controller performs a control operation to store at least one part of adaptively changeable predetermined parameters as the at least one of second operation parameters based on whether a normal operation is performed with the at least one loaded operation parameter.

In another aspect of the present disclosure, an audio-video-navigation (AVN) system for vehicles includes: an operational specification unit loading at least one of first operation parameters when a connected device or service corresponds to new connection; a connected device/service management loading at least one of second operation parameters when the connected device or service does not correspond to a new connection; an operation monitoring unit determining whether a normal operation is performed with the at least one loaded operation parameter; a service/function controller determining whether to maintain or change the at least one loaded operation parameter based on whether a normal operation is performed with the at least one loaded operation parameter; a specification change processor changing at least one part of adaptively changeable predetermined parameters when it is determined to change the at least one loaded operation parameter; and an operation parameter setting unit storing in the connected device/service management unit at least one part of adaptively changeable predetermined parameters as the at least one of second operation parameters based on whether a normal operation is performed with the at least one loaded operation parameter.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
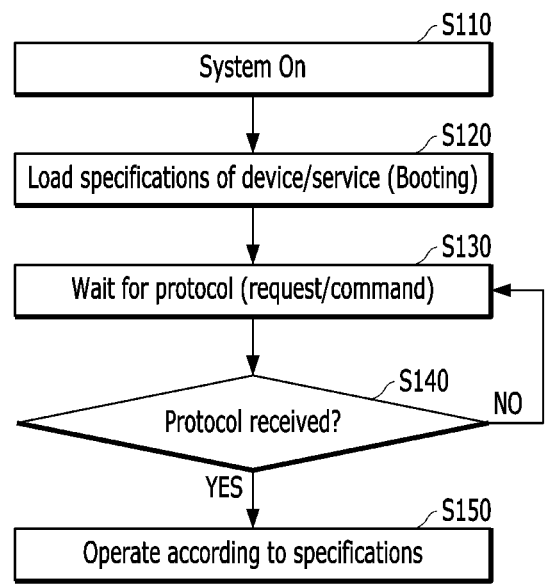
FIG. 1 is a flowchart illustrating provision of a typical connected service.

Reference will now be made in detail to embodiments of the present disclosure, examples of which are illustrated in the accompanying drawings. Wherever possible, the same reference numbers will be used throughout the drawings to refer to the same or like parts. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the suffixes "module" and "unit" are added or used interchangeably to simply facilitate preparation of this specification and are not intended to suggest meanings or functions distinguished therebetween. The singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

In describing embodiments disclosed in this specification, relevant well-known technologies which are obvious to those skilled in the art may not be described in detail in order not to obscure the subject matter of the present disclosure.

Embodiments of an apparatus for providing a connected service and a control method thereof will be discussed below after a description of provision of a typical connected service with reference to FIG. 1.

FIG. 1 is a flowchart illustrating provision of a typical connected service. It is assumed that the system discussed in the following description including FIG. 1 is an AVN system.

As shown in FIG. 1, as a system is turned on (S110), booting is performed, and specifications of devices/services supported by the system are loaded (S120). When booting is completed, a request or command according to a specific protocol is awaited (S130). When a request or command is received according to the specific protocol in the waiting mode (S140), an operation is performed according to the specifications of the corresponding device/service under the protocol (S150).

A conventional system is usually developed based on one target specification when a platform therefor is developed. Thereby, even if 10 external devices and services exhibit good performance without any problem, systems have been developed to generalize the specification or lower operation performance such that operations are performed according to one device or service exhibiting lower performance or having an error.

As a result, a specific device/service which is not compatible with the target specification at the time of development will develop an error as the collision problem with the device/service is unavoidable. As such error is unconditionally processed as an exception, the service cannot be appropriately provided. Moreover, even in establishing connection with a device/service exhibiting good performance, operations may be performed with low performance which was set at the stage of development.

In embodiments of the present disclosure, regarding the connection issue raised by a difference among specifications of connected devices or services from different providers, it is suggested that the system accept and learn operational properties of a new device/service and automatically change the corresponding operational specification of the system for the device/service, rather than performing generalized handling of the issue as an exception. Thereby, the operation performances conventionally designed to be low to ensure compatibility may be set differently according to devices or services to effectively improve, for example, an operation speed felt by the customers. Thereby, the overall functions and quality of services may be enhanced.

Hereinafter, a procedure of providing a connected service according to embodiments of the present disclosure will be described with reference to FIG. 2.

Figure 2:
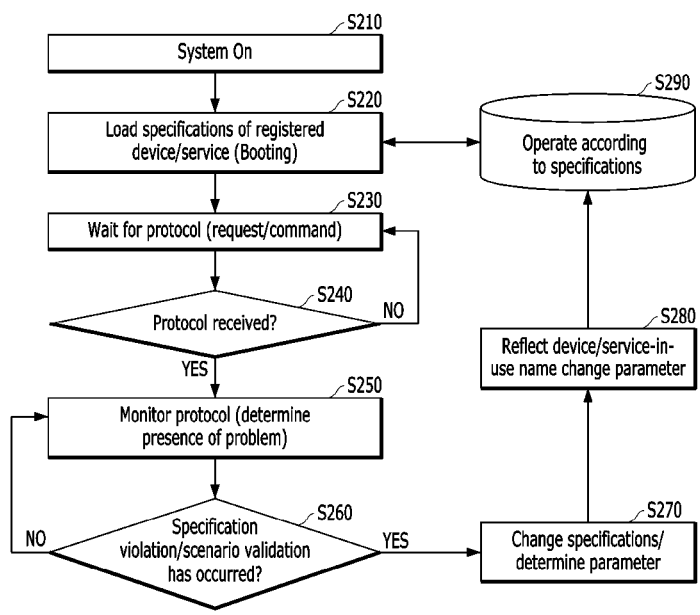
FIG. 2 is a flowchart illustrating a procedure of providing a connected service according to embodiments of the present disclosure.

FIG. 2 is a flowchart illustrating a procedure of providing a connected service according to embodiments of the present disclosure.

As shown in FIG. 2, as a system is turned on (S210), booting is performed, and specifications of devices/services supported by the system are loaded (S220). When booting is completed, a request or command according to a specific protocol is awaited (S230). When the request or command is received according to the specific protocol in the waiting mode (S240), an operation is performed according to the specifications of the corresponding device/service under the protocol, and it is determined whether a problem occurs (S250).

If there is a problem such as violation of the specification or violation of a scenario occurs as a result of the determination (S260), the system determines a parameter whose specification needs to be changed to address the problem (S270), changes the parameter for the device or service which is currently being used, and adds the changed parameter (S280). The changed parameter is stored in a specification database for storing parameters for the respective devices/services (S290), and will be applied later when the specification of the same device/service is loaded.

Accordingly, in contrast with the conventional systems, issues such as a scenario error or violation of the specification may be adaptively handled by changing the values of the operation parameters that the external devices and services have.

Hereinafter, a system configuration and operation flow according to the above embodiment will be described in more detail with reference to FIGS. 3 and 4.

Figure 3:
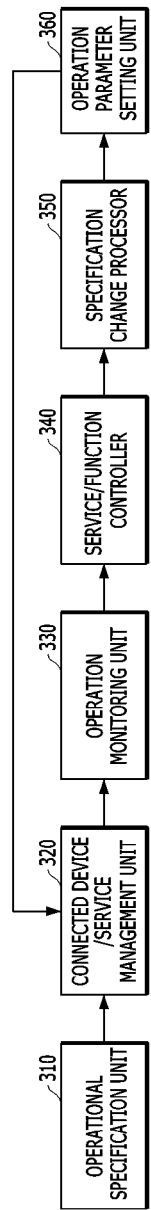
FIG. 3 illustrates an example configuration of an AVN system according to embodiments of the present disclosure.

FIG. 3 illustrates an example configuration of an AVN system according to embodiments of the present disclosure. The elements shown in FIG. 3 are distinguished from each other by the functions thereof, and may be identical to or different from the actual physical configurations.

First, when a device connected for the first time is sensed or a service is executed for the first time, an operational specification unit 310 serves to load operation parameters for the device or service. If the device or service corresponds to new connection, the operational specification unit 310 defines a default value (i.e., a default operation specification) defined according to a protocol which is applied at the initial design stage, and the stored value of the operation parameter is applied as a default whenever a new device or service (server) is connected.

A device/service management unit 320 may keep the changed parameter value stored therein for the connected service/device and load the parameter value to allow the system to manage the operational specification when the corresponding device is connected. Herein, the parameter values may be managed as one profile for each device. Normal devices having no history of problems may be managed through default parameter values in an integrated manner.

In brief, if a device/service is connected for the first time, a default operation parameter is loaded from the operational specification unit 310. Otherwise, an operation parameter for the corresponding device/service is loaded from the device/service management unit 320.

Once the operation parameters are loaded, an operation monitoring unit 330 monitors whether or not the operation is normally performed according to a defined protocol. For example, the operation monitoring unit 330 may monitor 1) whether the loaded operation parameter values are processed according to an expected scenario under the protocol, 2) whether a response of an external device or service to each request/response message of the protocol is returned at a set time (parameter), 3) whether a function or specific function of a service which is provided by the connected device/service and is signaled in response is normally performed (i.e., the quality of the service), and 4) whether a response to the final operation is normal even if the answer to any of the above three questions is negative.

A service/function controller 340 determines whether to maintain the loaded parameters, whether to set the parameters back to default values, and whether to change the scenario or specifications of the system.

Meanwhile, in determining whether to maintain, stop or adjust the service/function, the service/function controller 340 may reference an operation parameter defining unit (not shown). When the system performs an operation related to the connected service, the operation parameter defining unit functions as a database to define and store parameters which are adaptively changeable according to external devices. The parameter values consist of items affecting compatibility and quality of service. For example, parameters stored in the operation parameter defining unit may include a response time waiting timer, an error return value according to a command, whether or not a response is made to execution of an operation, service validity information, and a transmitted/received message at each stage of the protocol. Accordingly, the service/function controller 340 may determine the types of adaptively changeable parameters by making inquiries to the parameter defining unit, and determine, if a parameter related to resolution of a current problem is an adaptively changeable parameter, to change (i.e., adjust) the parameter. On the other hand, if the parameter related to resolution of the current problem is not an adaptively changeable parameter as a result of inquiries (i.e., the parameter is not stored in the operation parameter defining unit), the service/function controller 340 may determine to stop the service/function, considering that the problem cannot be settled by the system itself.

If the service/function controller 340 determines to change the parameter, a specification change processor 350 changes the corresponding parameter among the loaded parameters in real time, and notifies an operation parameter setting unit 360 of the change.

The operation parameter setting unit 360 applies the changed parameter value to the corresponding profile of the device/service management unit 320 such that the changed parameter may be immediately loaded when the corresponding device/service is connected next time.

Hereinafter, a procedure of operation of the system according to the aforementioned system configuration will be described with reference to FIG. 4.

Figure 4:
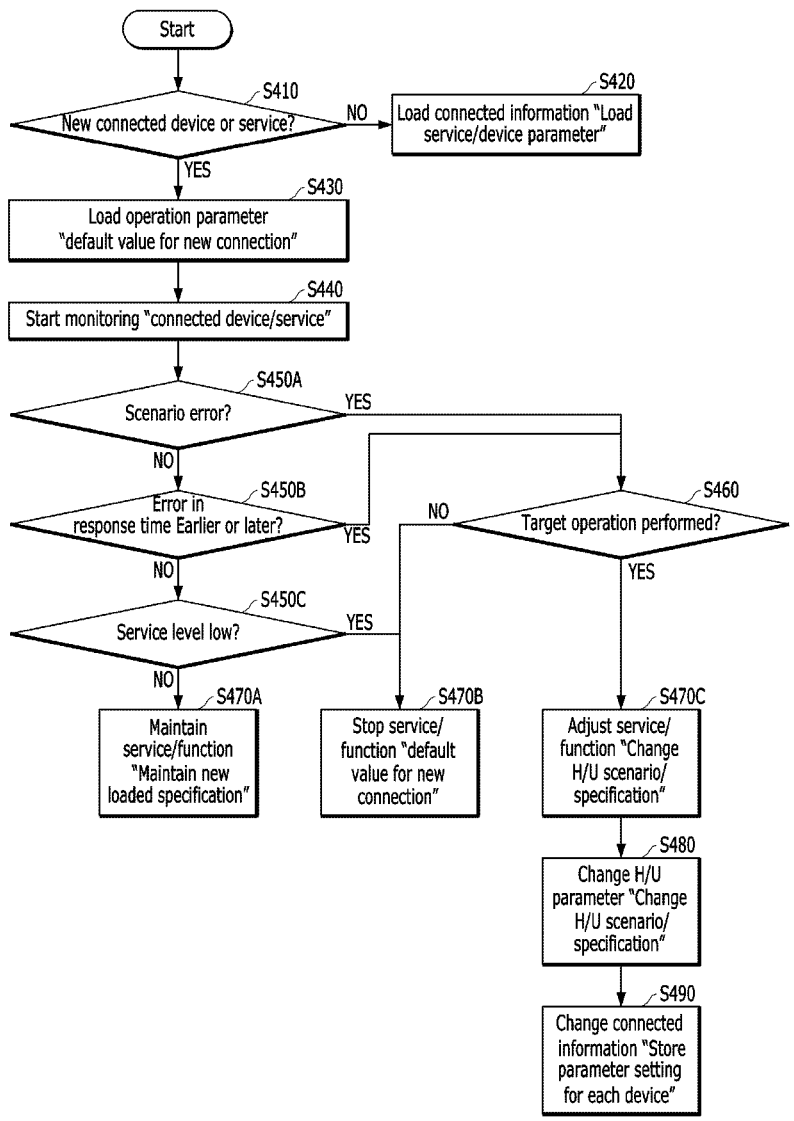
FIG. 4 is a flowchart illustrating a procedure of operating an AVN system according to embodiments of the present disclosure.

FIG. 4 is a flowchart illustrating a procedure of operating an AVN system according to embodiments of the present disclosure.

As shown in FIG. 4, it may be determined whether a connected device or executed service is a device connected for the first time or a service executed for the first time (S410).

If the device or service is not a new connected device/service, an operation parameter for the device/service may be loaded from the device/service management unit 320 (S420).

On the other hand, if the device/service is a new connected device/service, a default operation parameter may be loaded from the operational specification unit 310 (S430).

Once loading of the parameter is completed, the connected device/service begins to be monitored through the operation monitoring unit 330 (S440).

The monitoring operation may be performed to determine whether or not there is an error in the scenario (S450A) a response time (S450B) and a service level (S450C). The monitoring operation may also be performed to monitor whether the final target operation is performed even if there is an error (S460).

First, determination of a scenario error (S450A) is an operation of monitoring whether the loaded parameters are processed according to the scenarios expected under the respective protocols. This operation is performed to determine whether to change the scenario when an unexpected scenario occurs more than a certain number of times or the frequency of occurrence of the unexpected scenario is greater than or equal to a certain frequency.

In determination of the response time (S450B), whether or not a response to a request/response message of the protocol is returned by the external device/service at a set time (parameter) may be monitored using a timer. This operation is performed to change the response awaiting timer for the corresponding message of the system when the response time has a uniform delay.

In determination of the service level (S450C), an inquiry is made into whether or not the system supports a specific function or service for the connected device/service, and when a response is made to indicate that the specific function or service is supported by the connected device/service, it is determined whether or not the detailed functions of the corresponding service are normally performed. If the response indicating that the service/function is supported is received, but an error higher than or equal to a certain level is produced or if the service is not normally executed, provision of the service may be stopped (S470B). This is intended to interrupt provision of the service if the response to the internal operation of the service affects the quality of the service.

If the final target operation is normally executed despite there being a scenario error or a problem with the response time (S460), the service/function controller 340 may determine to change the scenario or specification so as to ignore the intermediate operations (S470C). Herein, the meaning of normal execution of the final target covers not only a case where the final target operation is normally performed and completed anyway, but also a case where the final target operation can be normally performed if at least a part of the parameters is modified. That is, this operation may include an operation of the service/function controller 340 determining whether the parameter for normally executing the final target operation is an adaptively changeable parameter by making an inquiry to the operation parameter defining unit.

If there is no abnormality as a result of the monitoring operation, the service/function controller 340 may determine to maintain the originally loaded specification (S470A). If the service level is low or the final target operation is not performed, the service/function controller 340 may stop the service/function and set the parameters to the default values (S470B). According to an embodiment, the service/function controller 340 may conduct a test of the corresponding function on the background later. If there is no problem with the service in the test, the service/function controller 340 may determine to restore the parameters related to the service such that the service is automatically activated.

If the service/function controller 340 determines to change the parameters, the specification change processor 350 may change the parameters to ensure normal operation of the service (S480), and the operation parameter setting unit 360 may store the changed parameters in the device/service management unit 320 (S490).

Hereinafter, a description will be given of application of the aforementioned operation of the system to a specific scenario.

As an example, in the following description, it is assumed that the AVN system delivers a call termination command to a smartphone in the middle of execution of a hands-free service with the AVN system and the smartphone connected to each other.

In the AVN system according to the existing specification, if a call termination response message is received within 2 to 3 seconds after the call termination command is delivered, it is considered that call termination has been normally implemented. However, if the response is delayed (e.g., the response is received after 5 seconds), termination of the call is forcibly output to the user interface. However, in reality, the hands-free service still occupies sound related resources, and as a result, media sound output or voice recognition may not operate.

In this case, with the AVN system according to embodiments of the present disclosure, when a service and device are connected for the first time, default parameters are loaded through the operational specification unit 310, and the operation monitoring unit 330 senses consistent generation of a delay (e.g., 5 seconds) of a call termination response while operation is performed according to the default parameters. Thereby, the specification change processor 350 changes the existing call termination response awaiting timer such that the timer corresponds to the delayed response time (e.g., 5.5 seconds). Accordingly, after this change, no error is produced even if the call termination response arrives after 5 seconds.

Meanwhile, since the operation parameter setting unit 360 changes the corresponding parameter in the device/service management unit 320, when the service/device is connected next time, the timer set to 5.5 seconds in the device/service management unit 320 is loaded as the operation parameter for the devices/service. Accordingly, the same problem is not repeated with the same device specification. Of course, if an error is caused in the device/service later due to a further delayed response time, the timer may be changed to be further delayed.

As another example, it is assumed that the AVN system makes a request for Bluetooth connection to the smartphone. There may be a case where a smartphone makes a request for A2DP connection to the AVN system first. Accordingly, to prevent collision between connection requests, a typical AVN system is configured to wait for a connection request of the smartphone for a predetermined time (e.g., 10 seconds). However, such waiting time may operate as an element delaying the service if the smartphone does not make a connection request first.

In this case, with the AVN system according to embodiments of the present disclosure, when a service and device are connected for the first time, a default parameter is loaded through the operational specification unit 310, and the monitoring unit 330 senses that there is no A2DP connection request from the smartphone during operation according to the default parameter. Thereby, the specification change processor 350 may change the existing connection request timer from 10 seconds to 0 second. Accordingly, the AVN system may attempt to immediately connect to the smartphone without waiting for a connection request of the smartphone after the corresponding point in time (including next re-connection).

Accordingly, according to embodiments of the present disclosure, the AVN system may determine the operational state of the device/service, and if a raised problem can be handled by the system, the specifications of the AVN system may be changed to prevent the problem. If the problem cannot be handled by the system, the AVN system may restrict use of the function/service to handle customer complaints which may be raised by persistent provision of the function which is not available to the customers.

Hereinafter, configuration of an apparatus for implementing the aforementioned embodiments will be described.

Figure 5:
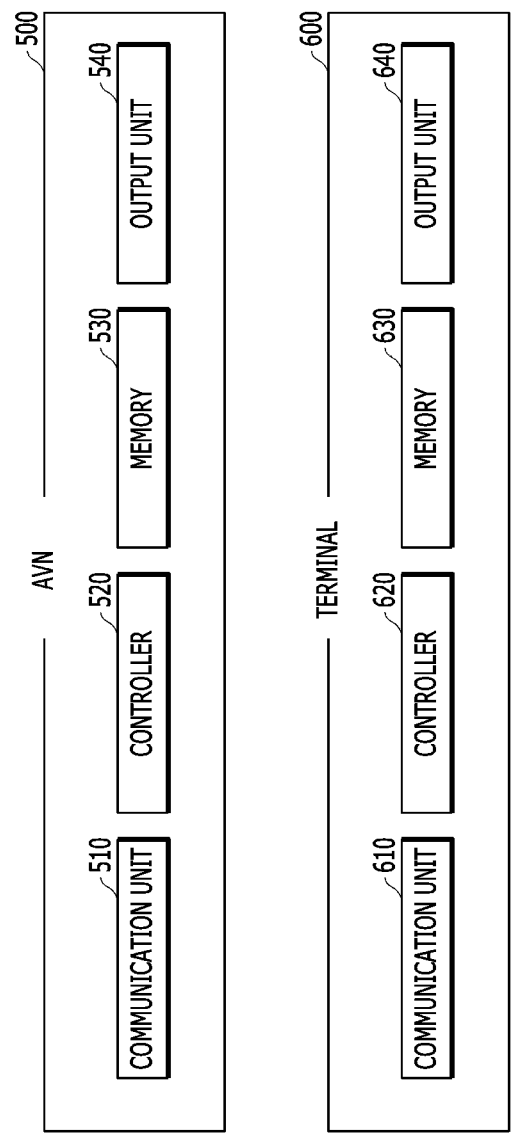
FIG. 5 is a block diagram illustrating the structure of an AVN system and a terminal for implementing a method for providing a connected service according to embodiments of the present disclosure.

FIG. 5 is a block diagram illustrating the structure of an AVN system and a terminal for implementing a method for providing a connected service according to embodiments of the present disclosure.

As shown in FIG. 5, an AVN system 500 and a terminal 600 may include a communication unit 510, 610, a controller 520, 620, a memory 530, 630, and an output unit 540, 640.

The elements shown in the FIG. 5 are not essential. It is obvious to those skilled in the art that more elements or fewer elements may be provided.

The communication unit 510 of the AVN system may include a first wired communication unit (e.g., CAN transceiver) for communication with other controllers in a vehicle, a second wired communication unit for USB connection, and a wireless communication unit for supporting wireless communication such as Bluetooth or Wi-Fi.

The communication unit 610 of the terminal may include a wired communication unit for USB connection and a wireless communication unit for supporting wireless communication such as Bluetooth, Wi-Fi, or 3G/4G.

The controller 520, 620 of the AVN and terminal may control overall operations of the rest of the elements. For example, in providing a connected service, the controller 520 of the AVN system may control overall operations including determining whether an external device is connected and whether a device/service is connected for the first time, loading an operation parameter according to the determination, monitoring whether or not the operation is normally performed according to the loaded parameter, determining processing of the function/service according to the result of the monitoring, applying parameter change according to determination of the processing, and interrupting the service. That is, the operation monitoring unit 330, the service/function controller 340, the specification change processor 350, and the operation parameter setting unit 360 may be implemented in the controller 520 through a physical processor module, program code, or a combination thereof.

In addition, in executing a connected service, the controller 620 of the terminal may control overall operations in the procedure of transmitting and receiving a request/response message according to a corresponding protocol.

The memory 530, 630, which collectively refers to a space and/or storage region for storing predetermined program code (OS, firmware, application, etc.) executed through the controller 520, 620 and data which is input/output when an operation is performed according to the program codes, may be provided in the form of an electrically erasable programmable read-only memory (EEPROM), a flash memory (FM), or a hard disk drive. For example, the operational specification unit 310, the device/service management unit 320, and the operation parameter defining unit may be implemented through the controller 520 of the AVN system.

The output unit 540, 640 may serve to output various kinds of information in a predetermined form recognizable by the user.

As explained above, the method according to the embodiments of the present disclosure described above may be implemented as a computer program and stored in a computer-readable medium. The computer-readable medium includes ROM, RAM, CD-ROM, magnetic tape, floppy disk, and optical data storage. The computer-readable medium may be distributed to computer systems connected over a network, and thus code readable by the computer may be stored and executed therein in a distributed manner. The functional program, code and code segments to implement the method described above may be easily inferred by programmers in the art to which embodiments of the present disclosure pertain.

As apparent from the above description, an apparatus and method for providing a connected service according to embodiments of the present disclosure have the following effects.

The connected service may be provided more efficiently for various devices and services. In particular, errors may be addressed by adaptively performing specification change according to devices or services in a situation where the errors occur.

It will be appreciated by those skilled in the art that the effects that can be achieved with the present disclosure are not limited to what has been described above and other advantages of the present disclosure will be clearly understood from the following detailed description taken in conjunction with the accompanying drawings. The present disclosure may be carried out in other specific ways than those set forth herein without departing from the spirit and essential characteristics of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for controlling an audio-video-navigation (AVN) system for vehicles, the method comprising:
    loading at least one of first operation parameters or at least one of second operation parameters corresponding to a connected service or device;
    determining whether a normal operation is performed with the at least one loaded operation parameter; and changing the at least one loaded operation parameter based on whether the normal operation is performed with the at least one loaded operation parameter, wherein the changing of the at least one loaded operation parameter comprises:

storing at least one part of adaptively changeable predetermined parameters as the at least one of second operation parameters based on whether the normal operation is performed with the at least one loaded operation parameter, wherein the loading of the at least one of first operation parameters or the at least one of second operation parameters comprises:

loading the at least one of first operation parameters when the connected service is executed for the first time or the device is connected for the first time; and loading the at least one of second operation parameters when the connected service was previously executed or the device was previously connected, wherein the determining of whether the normal operation is performed with the at least one loaded operation parameter comprises:

monitoring whether a final target operation is completed or executable irrespective of an abnormal operation, and wherein, when the final target operation is completed, the changing of the at least one operation parameter comprises:

changing the at least one part of the adaptively changeable parameters such that at least one part of intermediate operations prior to the final target operation is ignored irrespective of the abnormal operation.

2. The method according to claim 1, wherein:

the at least one of first operation parameters is loaded in a first module, and the at least one of second operation parameters is loaded in a second module, and the second module manages the at least one of second operation parameters as one profile for each connected service or device.

3. The method according to claim 1, wherein the determining of whether the normal operation is performed with the at least one loaded operation parameter comprises:

monitoring a scenario error;

monitoring a response time for a request; and monitoring a service level depending on whether a function is actually performed.

4. The method according to claim 3, wherein the determining of whether the normal operation is performed with the at least one loaded operation parameter further comprises:

when the abnormal operation is sensed during the monitoring of the scenario error and the monitoring of the response time, monitoring whether a final target operation is performed irrespective of the abnormal operation.

5. The method according to claim 4, wherein the changing of the at least one loaded operation parameter comprises:

changing the at least one loaded operation parameter to stop a function for the connected device or service when the final target operation is not performed or the service level is lower than a predetermined level.

6. The method according to claim 3, wherein the monitoring of the service level comprises:

determining that the service level is low when a function indicated in a response provided by the connected device or service is not normally operated.

7. A non-transitory computer-readable recording medium on which a program is recorded for performing the method for controlling the AVN system according to claim 1.

8. An audio-video-navigation (AVN) system for vehicles, the system comprising:

a communication unit connected with a service or device;

a memory storing at least one of first operation parameters or at least one of second operation parameters corresponding to a connected service or device; and a controller determining whether a normal operation is performed with the at least one loaded operation parameter and changing the at least one loaded parameter based on whether the normal operation is performed with the at least one loaded operation parameter, wherein the controller performs a control operation to store at least one part of adaptively changeable predetermined parameters as the at least one of second operation parameters based on whether the normal operation is performed with the at least one loaded operation parameter, and wherein the controller is further configured to:

load the at least one of first operation parameters when the connected service is executed for the first time or the device is connected for the first time;

load the at least one of second operation parameters when the connected service was previously executed or the device was previously connected;

determine whether the final target operation is completed or executable irrespective of an abnormal operation; and change the at least one part of the adaptively changeable parameters such that at least one part of intermediate operations prior to the final target operation is ignored irrespective of the abnormal operation.

9. The AVN system according to claim 8, wherein the memory manages the at least one of second operation parameters as one profile for each connected service or device.

10. The AVN system according to claim 8, wherein the controller monitors a scenario error, a response time for a request, and a service level depending on whether a function is actually performed.

11. The AVN system according to claim 10, wherein, when at least one of the scenario error and a delay in the response time is sensed, the controller monitors whether the final target operation is performed irrespective of the sensing.

12. The AVN system according to claim 11, wherein the controller changes the at least one loaded operation parameter to stop a function for the connected device or service when the final target operation is not performed or the service level is lower than a predetermined level.

13. The AVN system according to claim 10, wherein the controller determines that the service level is low when a function indicated in a response provided by the connected device or service is not normally operated.

14. An audio-video-navigation (AVN) system for vehicles, the system comprising:

an operational specification unit loading at least one of first operation parameters when a connected service is executed for the first time or a device is connected for the first time;

a connected device/service management loading at least one of second operation parameters when the connected service was previously executed or the device was previously connected;

an operation monitoring unit determining whether a normal operation is performed with the at least one loaded operation parameter;

a service/function controller determining whether to maintain or change the at least one loaded operation parameter based on whether the normal operation is performed with the at least one loaded operation parameter;

a specification change processor changing at least one part of adaptively changeable predetermined parameters when it is determined to change the at least one loaded operation parameter; and an operation parameter setting unit storing in the connected device/service management unit at least one part of adaptively changeable predetermined parameters as the at least one of second operation parameters based on whether the normal operation is performed with the at least one loaded operation parameter, wherein the operation monitoring unit is further configured to determine whether the final target operation is completed or executable irrespective of an abnormal operation, and wherein the specification change processor is further configured to change the at least one part of the adaptively changeable parameters such that at least one part of intermediate operations prior to the final target operation is ignored irrespective of the abnormal operation.

\* \* \* \* \*